April 29, 1930.   H. R. PENNINGTON   1,756,568
METALLIC WELDING ROD

Original Filed Aug. 4, 1927

COPPER & SILICON OR PHOSPHORUS
PURE TIN (8% OF TOTAL)

Witness:
Chas. R. Koursh.

Inventor,
Harry R. Pennington,
Geo. Bayard Jones Atty.

Patented Apr. 29, 1930

1,756,568

UNITED STATES PATENT OFFICE

HARRY R. PENNINGTON, OF CHICAGO, ILLINOIS, ASSIGNOR TO HOLLUP CORPORATION, A CORPORATION OF ILLINOIS

METALLIC WELDING ROD

Application filed August 4, 1927, Serial No. 210,571. Renewed March 12, 1930.

The present invention relates generally to built-up welding rods and electrodes and particularly to the structure, composition, and the relation of the structure to the composition.

Welds of various characters require particular compositions of welding rod for a particular type of weld. The composition of an electric weld and of a welding electrode are usually different because of a considerable loss of chemical elements in the welding arc during the welding process. The required composition of a welding rod or electrode is frequently such that when it is provided as a homogeneous mass it has physical properties, which do not permit a ready formation of it into a rod. Various metals and alloys are available in the market which are considered to be mechanically workable, that is they may be drawn, rolled and otherwise deformed.

The object of the present invention is to construct electrodes of varying average compositions by mechanically uniting a plurality of commercially available metals or alloys in a proper proportion to realize the desired average compositions.

A particular object of the invention is the provision of a plurality of lengths of metal or alloys joined together to form a rod structure.

Various physical structures may be employed to effect the purpose of the present invention and it is to be understood that the exact relation and the proportion of the parts will depend upon the desired average composition of the rod and the available compositions of metal or alloys which are to be incorporated into the rod.

In the accompanying drawings there are shown several embodiments of the invention illustrating mechanical forms, the compositions of which are particularly described hereinafter in the specification. In the drawings Fig. 1 represents a two component rod having a solid metal core surrounded by a metal sheath;

When a chrome steel weld is desired the welding rod must have a composition comprising iron, carbon and chromium. It is difficult and expensive to compound a homogeneous rod suitable for such use and it is impracticable to make and carry a stock of this type of rod with different average compositions for various chrome steels. Accordingly I build up such welding rods of metallic parts having compositions that average up to a desired composition. For example I may provide a carbon steel containing 0.5% to 1.0% carbon in the form of a strip, rod or wire, such as the round rod 10 shown in Fig. 1, covered by a sheath 11 of a commercially available alloy metal containing from 12 to 16% chromium combined with iron. The relative cross sectional areas of the core and the sheath may be varied to attain the desired average composition.

Figure 5:
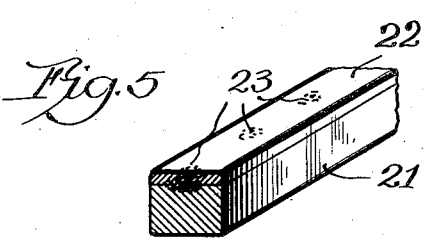
Fig. 5 illustrates two contiguous metal strips of different composition.

The form above described represents two contiguous lengths of essentially two component metals in which one component is common. Fig. 5 represents another form which may employ a similar relation of chemical elements. It is clear that the change of physical dimensions alone is sufficient to create a change in the ultimate average composition.

If a chrome nickel steel weld is desired the sheath 11 may be made of a strip of commercially available alloy containing chromium and nickel such for example as that which contains 17 to 20% chromium and from 7 to 10% nickel combined with iron.

Figure 2:
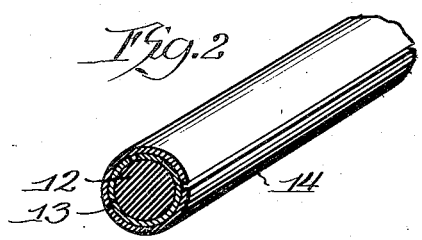
Fig. 2 represents a metal core surrounded by two metallic sheaths.

In order to permit greater variation in the proportions of two alloy metals, as exemplified by nickel and chromium, I may provide one alloy metal in sheath form and employ an independent length containing the other metal. Fig. 2 illustrates a welding rod made with a carbon steel core 12, a nickel containing sheath 13 and a chromium containing sheath 14. If the required percentage of nickel is not sufficiently high to warrant a circumferential sheath like 13, or would require an exceedingly thin circumferential sheath, the nickel content may be provided by the inclusion of a length of pure nickel or nickel alloy illustrated by the strip 15 contained between core 16 and the circumferential sheath 17 in Fig. 3.

Figure 1:
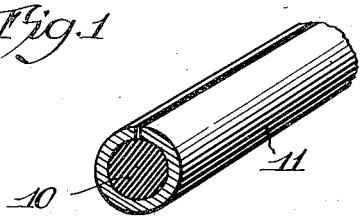
Figure 3:
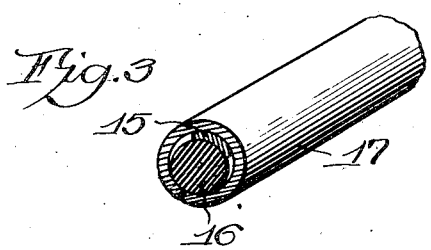
Fig. 3 represents two lengths of metal enclosed within a metallic sheath.
Figure 4:
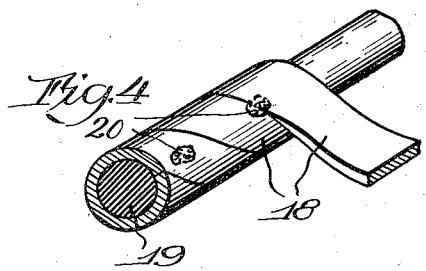
Fig. 4 illustrates a metal core surrounded by a metallic sheath formed of spirally wound metallic ribbon.

In illustrating a sheath by Figs. 1, 2 and 3, I do not intend to limit the term "sheath" to an open seamed tube-like structure firmly clasping the core, but contemplate other forms such as the spirally wound sheath 18 which surrounds core 19 of Fig. 4. Any sheath which I employ may be mechanically secured to the core, as for example, by binding it tightly and if desired the sheath may be spot welded at intervals to the core as illustrated at 20 in Fig. 4.

Figure 6:
Fig. 6 shows a rod constructed of two clinched channels of different metals.

The invention is not limited to sheathed cores, but contemplates other built-up rods such as shown in Figs. 5 and 6. In Fig. 5 two strips 21 and 22 of substantially rectangular cross section have two flat surfaces in contiguity and are held together by spot welding 23 at intervals. The rod 21—22 may be considered as comparable to the core 16-strip 15 of Fig. 3 which are bound together, not by spot welding, but by the sheath 17. A plurality of channel strips may be clinched together as illustrated by the clinching of two channels 24 and 25 in Fig. 6.

Figure 7:
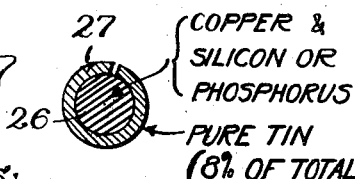
Fig. 7 represents a bronze welding rod of the form disclosed in Fig. 1.

The invention as to structure is not limited to steel alloys, but contemplates also other types such as bronze welding rods. Fig. 7 illustrates a core 26, which may be of material containing copper, and silicon or phosphorus covered by a sheath containing tin or being pure tin as illustrated by the sheath 27. In the bronze welding rod of Fig. 7 the tin may be present in sufficient amount to equal 8% of the total metal.

Because the physical character of certain desirable homogeneous compositions does not permit mechanical working such as rolling and drawing, the various built-up rods have a practical advantage from the manufacturing standpoint. Alloys in which carbon is over substantially 0.3% are not readily available commercially in cross sectional form suitable for rod making. Accordingly, the carbon for the weld is provided in the form of a carbon steel usually forming the core for the rod structure. The alloy metals are furnished preferably in the form of commercially available strips of a workable alloy composition which is adapted for being readily associated with the carbon-containing core.

I have used a variety of rods of varying composition by employing assembled lengths of available material. The following will illustrate the possible variations:

Example A

| | Per cent |
|---|---|
| Chromium | 7.20 |
| Nickel | 3.40 |
| Carbon | 0.45 |
| Manganese | 0.50 |

Remainder iron with usual limits of phosphorus, sulphur and silicon.

Example B

| | Per cent |
|---|---|
| Chromium | 2.0 to 5.0 |
| Carbon | 0.3 to 1.1 |

Remainder iron with usual limits of phosphorus, sulphur and silicon.

Example C

| | Per cent |
|---|---|
| Nickel | 0.0 to 5.0 |
| Carbon | 0.3 to 1.1 |

Remainder iron with usual limits of phosphorus, sulphur and silicon.

Example D

| | Per cent |
|---|---|
| Chromium | 0.0 to 10 |
| Nickel | 0.0 to 7 |

Remainder iron with usual limits of phosphorus, sulphur and silicon.

Such all-solid-metal rods, as distinguished from rods containing powdered metals and alloys, have the distinct advantage of uniformity and of average composition all along the length. The absence of powder reduces the exposed surface of the rod material and thus minimizes volatilization, oxidation and mechanical losses as may be produced by the heat from the welding flame or arc and mechanical abrasion and blowing away of the powder. The uniformity of structure and composition assures a sound deposit and a uniform action of the welding rod.

It will be understood that the present invention is not limited to the physical forms and the chemical elements herein shown and described. I contemplate the use of cast rods, say of cast iron for the introduction of a higher carbon content than may be provided by a carbon steel, or a pure tungsten wire or other pure metals or alloys as may be comprehended within the scope of the appended claim.

What I claim is:

A welding rod comprising two lengths of welding metal, one length being of base metal and the other being an alloy of mechanically workable metal, enclosing said first length and mechanically secured to the exterior thereof.

In testimony whereof, I have subscribed my name.

HARRY R. PENNINGTON.